United States Patent
Hattori et al.

(10) Patent No.: US 8,352,134 B2
(45) Date of Patent: Jan. 8, 2013

(54) CONTROLLER FOR VEHICLE CONTINUOUSLY VARIABLE TRANSMISSION

(75) Inventors: Kunio Hattori, Toyota (JP); Shinya Toyoda, Nissin (JP); Naoto Tanaka, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 15 days.

(21) Appl. No.: 13/128,810

(22) PCT Filed: Mar. 30, 2010

(86) PCT No.: PCT/JP2010/055734
§ 371 (c)(1),
(2), (4) Date: May 11, 2011

(87) PCT Pub. No.: WO2010/119766
PCT Pub. Date: Oct. 21, 2010

(65) Prior Publication Data
US 2011/0218718 A1    Sep. 8, 2011

(30) Foreign Application Priority Data
Apr. 15, 2009  (JP) .................................. 2009-099334

(51) Int. Cl.
*F16H 59/46* (2006.01)
*F16H 61/662* (2006.01)
*F16H 59/44* (2006.01)
*F16H 59/70* (2006.01)
(52) U.S. Cl. .......................................... 701/51; 701/61
(58) Field of Classification Search ...................... 701/51
See application file for complete search history.

(56) References Cited

U.S. PATENT DOCUMENTS

| | | | | | |
|---|---|---|---|---|---|
| 4,674,363 | A | * | 6/1987 | Miyawaki | 477/49 |
| 4,730,518 | A | * | 3/1988 | Miyawaki | 477/49 |
| 5,586,953 | A | * | 12/1996 | Abo | 477/47 |
| 6,009,365 | A | * | 12/1999 | Takahara et al. | 701/54 |
| 6,055,474 | A | * | 4/2000 | Adachi et al. | 701/51 |

(Continued)

FOREIGN PATENT DOCUMENTS

JP          7 317862        12/1995

(Continued)

OTHER PUBLICATIONS

International Search Report issued May 11, 2010 in PCT/JP10/55734 filed Mar. 30, 2010.

(Continued)

*Primary Examiner* — Shelley Chen
(74) *Attorney, Agent, or Firm* — Oblon, Spivak, McClelland, Maier & Neustadt, L.L.P.

(57) ABSTRACT

A controller for a vehicle continuously variable transmission is disclosed. When a target gear ratio is set as the maximum gear ratio and a vehicle speed is decreased to less than a first reference vehicle speed, the controller suspends varying of the gear ratio by the transmission control and starts a gear ratio hold control that releases operational oil from a first oil pressure chamber and holds the gear ratio at the maximum gear ratio. Further, the controller ends the gear ratio hold control and delivers operational oil to the first oil pressure chamber when the vehicle speed increases to a second reference vehicle speed or greater, which is lower than the first reference vehicle speed, and restarts the varying of the gear ratio by the transmission control when the vehicle speed subsequently increases to the first reference speed or greater.

5 Claims, 5 Drawing Sheets

U.S. PATENT DOCUMENTS

| | | | |
|---|---|---|---|
| 6,188,946 B1* | 2/2001 | Suzuki et al. | 701/62 |
| 7,568,995 B2* | 8/2009 | Soga et al. | 477/45 |
| 2001/0044686 A1* | 11/2001 | Taniguchi et al. | 701/51 |
| 2007/0298918 A1* | 12/2007 | Toyoda et al. | 474/28 |
| 2008/0039279 A1* | 2/2008 | Soga et al. | 477/45 |
| 2008/0153636 A1 | 6/2008 | Inoue et al. | |
| 2009/0280950 A1* | 11/2009 | Michishita et al. | 477/3 |

FOREIGN PATENT DOCUMENTS

| | | |
|---|---|---|
| JP | 9 152027 | 6/1997 |
| JP | 2001 214970 | 8/2001 |
| JP | 2001 304389 | 10/2001 |
| JP | 2005 172011 | 6/2005 |
| JP | 2008 014362 | 1/2008 |
| JP | 2008 075736 | 4/2008 |
| JP | 2008 157404 | 7/2008 |

OTHER PUBLICATIONS

International Preliminary Report on Patentability and Written Opinion issued Nov. 15, 2011 in PCT/JP2010/055734.

\* cited by examiner

CONTROLLER FOR VEHICLE CONTINUOUSLY VARIABLE TRANSMISSION

FIELD OF THE INVENTION

The present invention relates to a controller for a vehicle continuously variable transmission that controls oil pressure in an oil pressure chamber arranged in each pulley of the vehicle continuously variable transmission.

BACKGROUND

A belt-type continuously variable transmission is known as a variable transmission installed in an automobile or the like. The belt-type continuously variable transmission includes a primary pulley, to which drive force of the internal combustion engine is transmitted, a secondary pulley, which is coupled to the wheels, and a belt, which runs around the pulleys. The running radius of the belt differs for each pulley so that the gear ratio varies continuously and steplessly.

Such a belt-type continuously variable transmission increases and decreases the oil pressure of the oil pressure chamber in each pulley to vary the width of a groove extending along the pulley. This varies the running radius of the belt on the pulley and controls the gear ratio.

For example, to decrease the gear ratio, transmission control oil pressure, which is the oil pressure of the oil pressure chamber arranged in the primary pulley, is increased to narrow the groove width of the primary pulley. This increases the running radius of the belt on the primary pulley. At the same time, narrowing control oil pressure, which is the oil pressure of the oil pressure chamber arranged in the secondary pulley, is decreased to widen the groove width of the secondary pulley. This decreases the running radius of the belt on the secondary pulley. Consequently, the gear ratio is varied while suppressing slipping of the belt on the pulleys.

To increase the gear ratio, the transmission control oil pressure is decreased to widen the groove width of the primary pulley and decrease the running radius of the belt on the primary pulley. Further, the narrowing control oil pressure is increased to narrow the groove width of the secondary pulley and increase the running radius of the belt on the secondary pulley.

A controller that controls such a belt-type vehicle continuously variable transmission sets a target gear ratio in accordance with the depression amount of the accelerator pedal, the vehicle speed, the engine speed, and the like. The controller feedforward controls the transmission control oil pressure based on the target gear ratio and the narrowing control oil pressure. During the feedforward control, the controller also calculates the actual gear ratio based on the rotation speed of the primary pulley and the rotation speed of the secondary pulley to feedback control the transmission control oil pressure based on the deviation of the calculated actual gear ratio and the target gear ratio.

When an electromagnetic pickup rotation speed sensor is used as a rotation speed sensor that detects the rotation speed of each pulley and the rotation speed is low, due to the sensor characteristics, the detection accuracy may become low or the rotation speed may not be detected. Thus, when the vehicle speed is in an extremely low vehicle speed range, such as when the vehicle is about to stop, the rotation speed of the secondary pulley may not be accurately detected and accurate feedback control may be hindered. As a result, the controller would not be able to have the gear ratio conform to the target gear ratio, and the gear ratio would not be accurately controlled. This may result in instable transmission control.

Patent document 1 and patent document 2 each describe a controller for a vehicle continuously variable transmission that releases operational oil from the primary pulley to lower the transmission control oil pressure when determined that the vehicle speed is less than a reference speed and within an extremely low vehicle speed range, in which a rotation speed sensor cannot accurately detect the rotation speed of the secondary pulley. Such a structure widens the primary pulley with the tension of the belt so that the groove width of the primary pulley, which has a variable range, is held to be maximal. Thus, the gear ratio may be held at the maximum gear ratio even in a situation in which feedback control cannot be executed.

PRIOR ART DOCUMENT

Patent Document

Patent Document 1: Japanese Laid-Open Patent Publication No. 2005-172011
Patent Document 2: Japanese Laid-Open Patent Publication No. 2008-75736

SUMMARY OF THE INVENTION

The structure that releases operational oil from the primary pulley when the vehicle speed is less than the reference vehicle speed to hold the gear ratio at the maximum gear ratio has the next shortcomings. After releasing operational oil from the primary pulley, when the vehicle speed becomes greater than or equal to the reference vehicle speed, the varying of the gear ratio is restarted by normal transmission control. In this state, operational oil has been released from the primary pulley. Thus, the groove width of the primary pulley cannot be readily decreased. As a result, the belt slips on the pulleys when the varying of the gear ratio is restarted by normal transmission control. This hinders quick restarting of the varying of the gear ratio even when the rotation speed sensor starts to accurately detect the rotation speed of the primary pulley and secondary pulley.

To achieve the above object, one aspect of the present invention provides a controller for a vehicle continuously variable transmission. The vehicle continuously variable transmission includes a primary pulley, a secondary pulley, a belt, and a rotation speed sensor, which detects a rotation speed of each of the pulleys. The primary pulley receives drive force from an internal combustion engine. The secondary pulley is coupled to a wheel. The belt runs around the pulleys. The belt transmits the drive force from the primary pulley to the secondary pulley. The controller executes transmission control to vary a gear ratio by varying a transmission control oil pressure, which is an oil pressure of a first oil pressure chamber arranged in the primary pulley, and a narrowing control oil pressure, which is an oil pressure of a second oil pressure chamber arranged in the secondary pulley, while calculating an actual gear ratio based on the rotation speed of each pulley and executing feedback control so that the actual gear ratio conforms to a target gear ratio. The controller, when the target gear ratio is set as a maximum gear ratio and a vehicle speed is decreased to less than a first reference vehicle speed, suspends varying of the gear ratio by the transmission control and starts a gear ratio hold control that releases operational oil from the first oil pressure chamber and holds the gear ratio at the maximum gear ratio. The controller ends the gear ratio hold control and delivers operational oil to the first oil pressure chamber when the vehicle speed increases to a second reference vehicle speed or greater, which is lower than the first reference vehicle speed, and restarts the varying of the gear ratio by the transmission control when the vehicle speed subsequently increases to the first reference speed or greater.

It is an object of the present invention to provide a vehicle continuously variable transmission that holds the gear ratio at the maximum gear ratio by releasing operational oil from a primary pulley when in an extremely low vehicle speed range, while also readily restarting the varying of the gear ratio when the vehicle speed increases and the rotation speed sensor begins to accurately detect the rotation speed.

DETAILED DESCRIPTION OF THE INVENTION

A vehicle continuously variable transmission according the present invention and embodied in an electronic controller that centrally controls a vehicle will now be described with reference to FIGS. 1 to 5.

Figure 1:
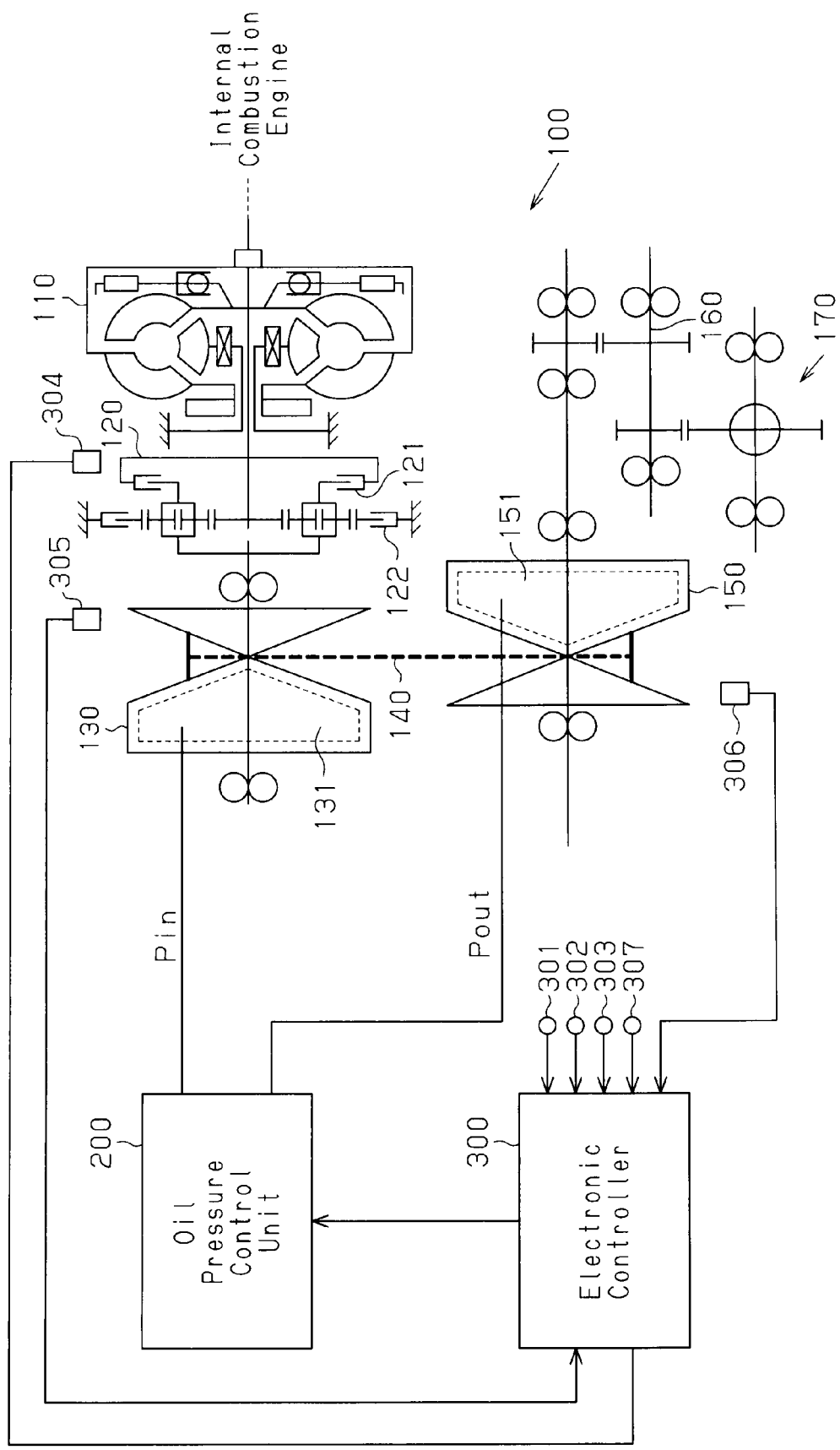
FIG. 1 is a schematic diagram showing the structure of a vehicle continuously variable transmission according to one embodiment of the present invention.

FIG. 1 is a schematic diagram showing the structure of a continuously variable transmission 100 of the present embodiment and the relation between the continuously variable transmission 100 and an electronic controller 300, which controls the continuously variable transmission 100. As shown in FIG. 1, the continuously variable transmission 100 of the present embodiment includes a torque converter 110 with an output shaft connected to an input shaft of an forward-reverse switching mechanism 120.

The forward-reverse switching mechanism 120, which is a double pinion type planetary gearing mechanism, includes a forward clutch 121 and a reverse brake 122. When the forward clutch 121 is in an engaged state and the reverse brake 122 is in a disengaged state, the drive force of an internal combustion engine input through the torque converter 110 is directly transmitted to a primary pulley 130. The primary pulley 130 is rotated in the same direction as the rotation direction of a crankshaft, which is an output shaft of the internal combustion engine. This moves the vehicle forward. In contrast, when the forward clutch 121 is in a disengaged state and the reverse brake 122 is in an engaged state, the drive force of the internal combustion engine input through the torque converter 110 is reversed and transmitted to the primary pulley 130. The primary pulley 130 is rotated in the direction opposite to the rotation direction of a crankshaft. This moves the vehicle in reverse.

The forward-reverse switching mechanism 120 may cause the forward clutch 121 and the reverse brake 122 to both be in a disengaged state. This cuts the transmission of drive force between the internal combustion engine and the primary pulley 130 and produces a neutral state.

The forward-reverse switching mechanism 120 includes an output shaft connected to the primary pulley 130. A belt 140, which is shown at the middle of FIG. 1, links the primary pulley 130 to a secondary pulley 150.

As shown by broken lines in FIG. 1, an oil pressure chamber 131 (first oil pressure chamber) is arranged in the primary pulley 130. The oil pressure in the oil pressure chamber 131 (transmission control oil pressure Pin) of the primary pulley 130 is increased and decreased to vary the groove width of the primary pulley 130.

More specifically, when operational oil is drawn into the oil chamber 131 and the oil pressure of the oil pressure chamber 131 is increased, the oil pressure acts to decrease the groove width of the primary pulley 131. In contrast, when operational oil is released from the oil chamber 131 to decrease the oil pressure of the oil pressure chamber 131, the groove width of the primary pulley 130 is increased.

As shown by broken lines in FIG. 1, an oil pressure chamber 151 (second oil pressure chamber) is arranged in the secondary pulley 150, which is linked by the belt 140 to the primary pulley 130. In the same manner as the primary pulley 130, the secondary pulley 150 also increases and decreases the oil pressure of the oil pressure chamber 151 (narrowing control oil pressure Pout) to change the groove width of the secondary pulley 150.

As shown at the lower right side of FIG. 1, a reduction gear 160 couples the secondary pulley 150 to a differential 170. Rotation force is transmitted from the secondary pulley 150 to the reduction gear 160. The drive force transmitted to the reduction gear 160 is further transmitted by the differential 170 to the left and right drive wheels.

In the continuously variable transmission 100 of the present embodiment, as shown in FIG. 1, an oil pressure control unit 200 controls the transmission control oil pressure Pin, which is the oil pressure of the oil chamber 131, to vary the running radius of the belt 140 on the primary pulley 130. Further, the oil pressure control unit 200 controls the narrowing control oil pressure Pout, which is the oil pressure of the oil chamber 151, to vary the running diameter of the belt 140 on the secondary pulley 150. This adjusts the tension of the belt 140 and varies a gear ratio γ continuously and steplessly, while suppressing slipping of the belt 140 on the primary pulley 130 and secondary pulley 150.

The oil control unit 200, which includes a plurality of solenoid valves driven by commands from the electronic controller 300, is an oil pressure circuit that supplies the oil pressure chambers 131 and 151 with operational oil discharged from an oil pump. The oil control unit 200 adjusts the flow rate of the operational oil supplied to the oil pressure chambers 131 and 151 based on commands output from the electronic controller 300. Further, the oil control unit 200 adjusts the flow rate of the operational oil discharged from the hydraulic pressure chambers 131 and 151.

The electronic controller 300 includes a central processing unit (CPU), which performs various computations related to engine control and transmission control executed by the oil control unit 200, a read only memory (ROM), which stores computation programs and computation maps for the computations and various data, and a random access memory (RAM), which temporarily stores the computation results and the like.

As shown in FIG. 1, the electronic controller 300 includes an accelerator position sensor 301, an airflow meter 302, a crank angle sensor 303, a turbine rotation speed sensor 304, a primary pulley rotation speed sensor 305, a secondary pulley rotation speed sensor 306, and wheel speed sensors 307.

The accelerator position sensor 301 detects the amount of the accelerator pedal depressed by the driver. The airflow meter 302 detects an intake air amount GA drawn into the internal combustion engine and an intake air temperature THA. The crank angle sensor 303 detects an engine speed NE based on a rotation speed of the crankshaft, which is an output shaft of the internal combustion engine. The turbine rotation speed sensor 304 is arranged near the forward-reverse switching mechanism 120 to detect a rotation speed NT of a turbine in the torque converter 110. The primary pulley rotation speed sensor 305 is arranged near the primary pulley 130 to detect a rotation speed Nin of the primary pulley 130. The secondary pulley rotation speed sensor 306 is arranged near the secondary pulley 150 to detect a rotation speed Nout of the secondary pulley 150. The wheel speed sensors 307 are arranged near the wheels to detect rotations speeds Nt1, Nt2, Nt3, and Nt4 of the corresponding wheels.

The electronic controller 300 centrally controls the internal combustion engine and the continuously variable transmission 100 based on the output signals from the various sensors 301 to 307. For example, the electronic controller 300 calculates a vehicle speed SPD based on the rotation speed Nout of the secondary pulley 150 detected by the secondary rotation speed sensor 306. Further, the electronic controller 300 calculates a required torque based on the present vehicle speed SPD and the depression amount of the accelerator pedal detected by the accelerator position sensor 301. The electronic control unit 300 adjusts an open amount of a throttle valve for the internal combustion engine and controls the intake air amount GA to realize the required torque. Further, the electronic control unit 300 calculates a target gear ratio γtrg to control the transmission control oil pressure Pin and the narrowing control oil pressure Pout so that the gear ratio γ conforms to the target gear ratio γtrg.

In the transmission control, the electronic controller 300 feedforward controls the transmission control oil pressure Pin based on the calculated target gear ratio γtrg and the present narrowing control oil pressure Pout. At the same time, the electronic controller 300 calculates the actual gear ratio γ based on the rotation speed Nin of the primary pulley 130 and the rotation speed Nout of the secondary pulley 150. Then, the electronic controller 300 feedback controls the transmission control oil pressure Pin so that the calculated gear ratio γ conforms to the target gear ratio γtrg. In this manner, the electronic controller 300 controls the transmission control oil pressure Pin. Further, the electronic controller 300 varies the narrowing control oil pressure Pout to suppress slipping of the belt 140 on the pulleys 130 and 150 and varies the gear ratio γ.

When the rotations speeds Nin, Nout of the pulleys 130 and 150 are extremely low, due to the characteristics of the rotation speed sensors 305 and 306, the detection accuracy of the rotation speeds Nin and Nout may become low or otherwise not be detected at all.

Thus, for example, when in an extremely low vehicle speed range, in which the vehicle speed SPD is extremely low such as when the vehicle is about to stop, the rotation speed Nout of the secondary pulley 150 becomes extremely low, and the rotation speed Nout cannot be accurately detected. As a result, the electronic controller 300 would not be able to accurately calculate the present gear ratio γ. This would hinder accurate feedback control and may destabilize transmission control.

Hence, when the vehicle speed SPD is less than the reference vehicle speed and it is thereby determined that the vehicle speed SPD is in the extremely low vehicle speed range, in which the rotation speed Nout of the secondary pulley 150 cannot be accurately detected, a gear ratio hold control may be executed to decrease the transmission control oil pressure Pin by releasing operational oil from the oil pressure chamber 131 of the primary pulley 130.

The employment of a structure that executes the gear ratio hold control widens the primary pulley 130 with the tension of the belt 140 so that the groove width of the primary pulley 130, which has a variable range, is held to be maximal. Thus, the gear ratio γ is held at a maximum gear ratio γmax even in a situation in which feedback control cannot be executed.

However, the structure that releases operational oil from the primary pulley 130 when the vehicle speed SPD is less than the reference vehicle speed to hold the gear ratio γ at the maximum gear ratio γmax has the following shortcomings. After releasing operational oil from the primary pulley 130, when the vehicle speed SPD becomes greater than or equal to the reference vehicle speed, the varying of the gear ratio γ is restarted by normal transmission control. In this state, operational oil has been released from the primary pulley 130. Thus, the groove width of the primary pulley 130 cannot be readily decreased.

As a result, the belt 140 slips on the pulleys 130 and 150 when the varying of the gear ratio γ is restarted by normal transmission control. This hinders quick restarting of the varying of the gear ratio γ even when the rotation speed sensor 306 starts to accurately detect the rotation speed Nout of the secondary pulley 150 with the secondary pulley rotation sensor 306.

Hence, in the electronic controller 300 of the present embodiment, operational oil is released from the oil pressure chamber 131 when in the extremely low vehicle speed range. Further, gear ratio hold control is executed to change operational oil into the oil pressure chamber before normal transmission control is restarted.

Figure 2:
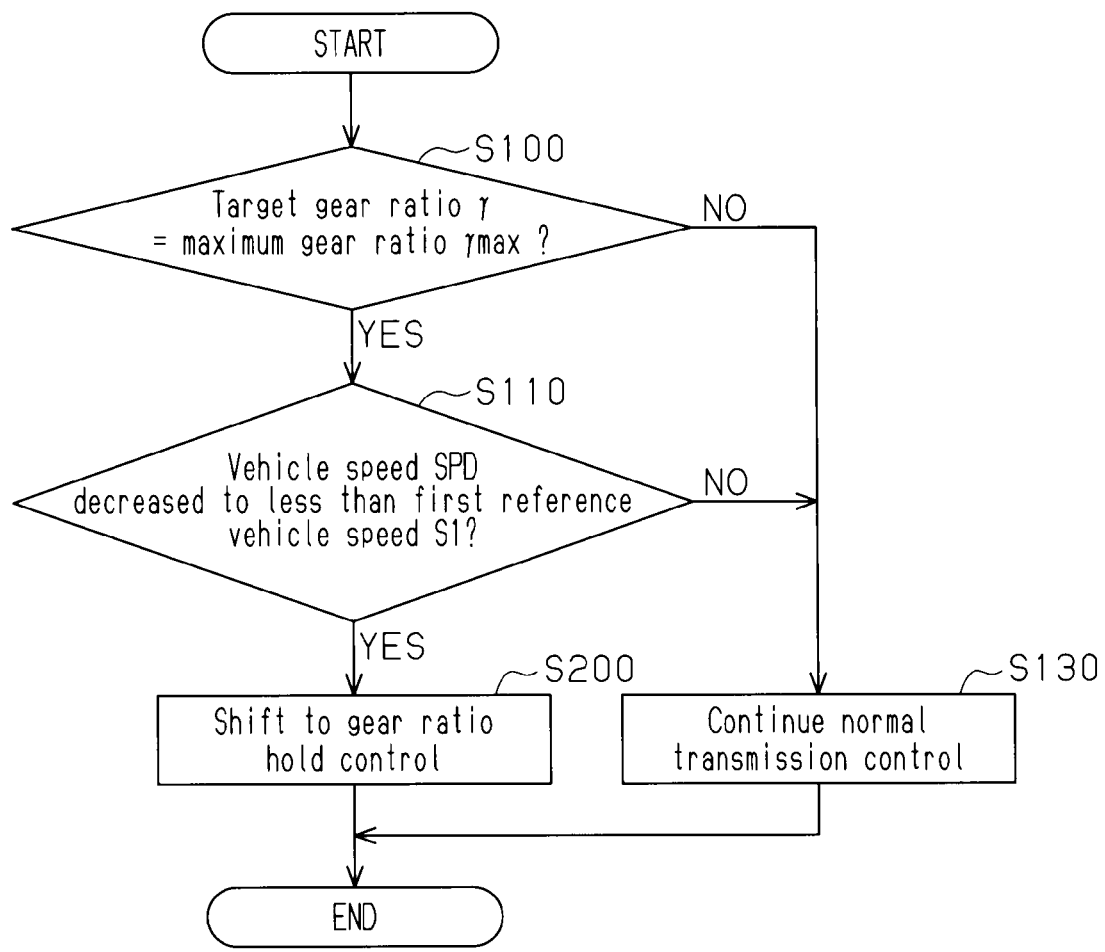
FIG. 2 is a flowchart showing a processing flow for determining whether or not to shift transmission control to gear ratio hold control in the vehicle continuously variable transmission of FIG. 1.

The gear ratio hold control will now be discussed with reference to FIGS. 2 and 3. FIG. 2 is a flowchart showing the flow of a shifting determination process for determining whether or not to shift the transmission control from normal transmission control, which includes the above-described feedforward control and feedback control of the transmission control oil pressure Pin, to gear ratio hold control. The electronic controller 300 repeats the shifting determination process in a predetermined control cycle when normal transmission control is being executed.

When the shifting determination process starts, as shown in FIG. 2, in step S100, the electronic controller 300 determines whether or not the target gear ratio γtrg is set as the maximum gear ratio γmax.

When it is determined in step S100 that the target gear ratio γtrg is set as the maximum gear ratio γmax (YES in step S100), step S110 is performed to determine whether of not the vehicle speed SPD has decreased to less than a first reference vehicle speed S1. More specifically, the vehicle speed SPD calculated in the previous control cycle and the vehicle speed SPD calculated in the present control cycle are compared to determine whether or not the vehicle speed SPD is decreasing and the decreasing vehicle speed SPD has passed by the first reference vehicle speed S1 during a period between the previous control cycle and the present control cycle. When it is determined that the vehicle speed SPD is decreasing and the decreasing vehicle speed SPD has passed by the first reference vehicle speed S1 during the period between the previous control cycle and the present control cycle, it is determined that the vehicle speed SPD has decreased to less than the first reference vehicle speed S1.

The first reference vehicle speed S1 is set based on a lower limit value of the vehicle speed SPD that allows for the secondary pulley rotation speed sensor 306 to accurately detect the rotation speed Nout of the secondary pulley 150.

When it is determined in step S110 that the vehicle speed SPD has decreased to less than the first reference vehicle speed S1 (YES in step S110), step S200 is performed to shift the transmission control from the normal transmission control to the gear ratio hold control.

More specifically, the normal transmission control, which includes the feedforward control and feedback control described above, is suspended to shift the transmission control from the normal transmission control to the gear ratio hold control.

When a negative determination is made in step S100 or step S110 (NO in step S100 or NO in step S110), step S130 is performed to continue the normal transmission control.

The electronic controller 300 repetitively performs the shifting determination process and shifts the transmission control from the normal transmission control to the gear ratio hold control when the target gear ratio γtrg is set as the maximum gear ratio γmax and the vehicle speed SPD decreases to less than the first reference vehicle speed S1.

The gear ratio hold control of the present embodiment will now be discussed with reference to FIG. 3. FIG. 3 is a flowchart showing the flow for processing the gear ratio hold control of the present embodiment. The electronic controller 300 performs this process in a predetermined control cycle.

Figure 3:
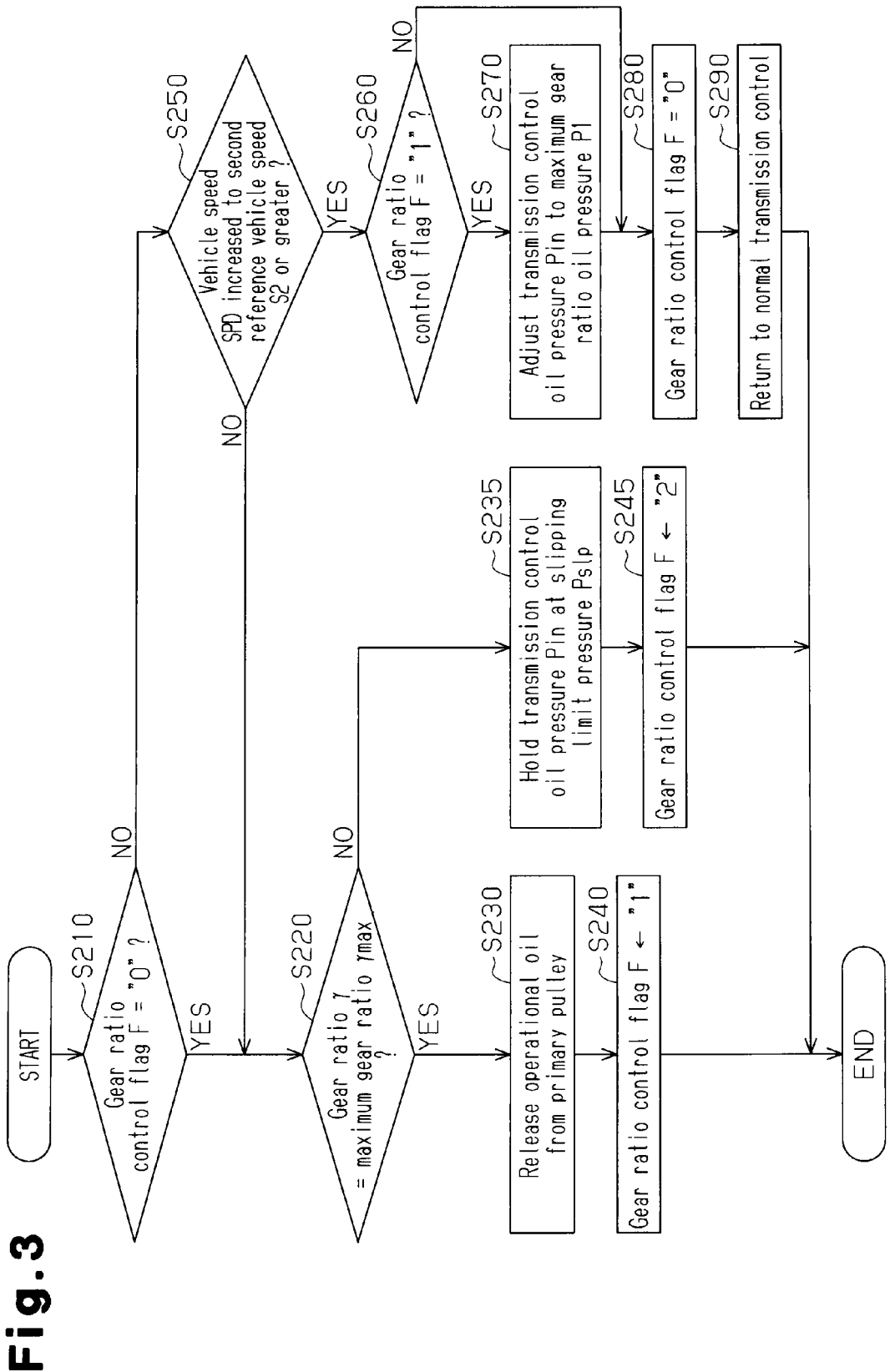
FIG. 3 is a flowchart showing the flow of a processing flow of the gear ratio hold control.

When the transmission control is switched from the normal transmission control to the gear ratio hold control and the gear ratio hold control is started, as shown in FIG. 3, the electronic controller 300 first determines in step S210 whether or not a gear ratio hold control flag F is "0".

The gear ratio hold control flag F is a flag for determining whether or not the transmission control has just shifted from the normal transmission control to the gear ratio hold control and whether or not operational oil has been released from the oil pressure chamber 131. Further, the gear ratio hold control flag F is stored in a memory of the electronic controller 300 during the gear ratio hold control. When the transmission control has just shifted from the normal transmission control to the gear ratio hold control and the gear ratio hold control is executed for the first time, the gear ratio hold control flag F is set to "0", which indicates that the gear ratio hold control was not executed in the previous control cycle.

When it is determined in step S210 that the gear ratio hold control flag F is "0" (YES in step S210), that is, when it is determined that the shifting to the gear ratio control has just been performed, step S220 is performed to determine whether or not the gear ratio γ is equal to the maximum gear ratio γmax.

More specifically, when the gear ratio γ, calculated just before the transmission control is shifted from the normal transmission control to the gear ratio hold control, is deviated from the maximum gear ratio γmax, it is determined that the gear ratio γ is not equal to the maximum gear ratio γmax. In contrast, when the gear ratio γ, calculated just before the transmission control is shifted from the normal transmission control to the gear ratio hold control, is close to the maximum gear ratio γmax, it is presumed accordingly that the gear ratio γ has reached the maximum gear ratio γmax and thereby determined that the gear ratio γ is equal to the maximum gear ratio γmax.

When it is determined in step S220 that the gear ratio γ is equal to the maximum gear ratio γmax (YES in step S220), step S230 is performed to release operational oil from the oil pressure chamber 131 in the primary pulley 130 so that the transmission control oil pressure Pin becomes "0". Then, the electronic controller 300 proceeds to step S240 to set the gear ratio hold control flag F to "1" and temporarily ends the processing.

When it is determined in step S220 that the gear ratio γ is not equal to the maximum gear ratio γmax (NO in step S220), step S235 is performed.

Here, the transmission control oil pressure Pin is decreased to and held at a slipping limit oil pressure Pslp. The slipping limit oil pressure Pslp is the minimum value of the transmission control oil pressure Pin at which slipping of the belt 140 does not occur in a state in which the gear ratio γ is held. Further, the slipping limit oil pressure Pslp is calculated based on the input torque from the internal combustion engine, which is presumed from the engine speed NE, the intake air amount GA, the fuel injection amount, and the like, and the narrowing control oil pressure Pout.

When the transmission control oil pressure Pin is decreased to the slipping limit oil pressure Pslp in step S235, the electronic controller 300 proceeds to step S245 to set the gear ratio control flag F to "2" and then temporarily ends the processing.

The gear ratio hold control is executed in this manner. When the gear ratio hold control flag F is set to "1" or "2", it is determined in step S210 of the next control cycle that the gear ratio hold control flag F is not "0".

In step S210, when it is determined that the gear ratio hold control flag F is not "0" (NO in step S210), step S250 is performed to determine whether or not the vehicle speed SPD has increased to a second reference vehicle speed S2.

More specifically, the vehicle speed SPD calculated in the previous control cycle is compared with the vehicle speed SPD calculated in the present control cycle to determine whether or not the vehicle speed is increasing and whether the increasing vehicle speed SPD has passed by the second reference vehicle speed S2 during a period between the previous control cycle and the present control cycle. When it is determined that the vehicle speed SPD is increasing and the increasing vehicle speed SPD has passed by the second reference vehicle speed S2 during the period between the previous control cycle and the present control cycle, it is determined that the vehicle speed SPD has increased to the second reference vehicle speed S2 or greater.

The second reference vehicle speed S2 is set as a value that is smaller than the first reference vehicle speed. The second reference vehicle speed S2 need only be set as a value that allows for determination that the rotation speed Nout of the secondary pulley 150 is increasing even when the rotation speed Nout of the secondary pulley 150 cannot be accurately detected.

When it is determined that the vehicle speed SPD has not increased to the second reference vehicle speed S2 or greater in step S250 (NO in step S250), step S220 is performed as shown in FIG. 3 to continue executing the gear ratio hold control.

More specifically, when operational oil is released from the oil chamber 131 and the transmission control oil pressure Pin is "0", the gear ratio γ is held at the maximum gear ratio γmax. When the transmission control oil pressure Pin is held at the slipping limit oil pressure Pslp, the transmission control oil pressure Pin is continuously held at the slipping limit oil pressure Pslp to hold the present gear ratio γ.

When it is determined in step S250 that the vehicle speed SPD has increased to the second reference vehicle speed S2 or greater (YES in step S250), step S260 is performed to determine whether or not the gear ratio hold control flag F is "1".

When it is determined in step S260 that the gear ratio control flag F is "1" (YES in step S260), it is determined that operation oil has been released from the oil pressure chamber 131 and step S270 is performed. The transmission control oil pressure Pin is adjusted to a maximum gear ratio oil pressure P1, and operational oil is delivered to the oil pressure chamber 131 of the primary pulley 130. The maximum gear ratio oil pressure P1 is a reference value of the transmission control oil pressure Pin when adjusting the gear ratio γ to the maximum gear ratio γmax under normal transmission control.

When the oil pressure chamber 131 of the primary pulley 130 is filled with operational oil, step S280 is performed to reset the gear ratio hold control flag F to "0".

Then, step S290 is performed to return the transmission control from the gear ratio hold control to the normal transmission control.

When it is determined in step S260 that the gear ratio hold control flag F is not "1" (NO in step S260), that is, when it is determined that the gear ratio hold control flag F is set to "2", it is determined that the transmission control oil pressure Pin is held at the slipping limit oil pressure Pslp. Then, step S270 is skipped, and step S280 is performed.

Here, the gear ratio control flag F is reset to "0". Then, step S290 is performed to return the transmission control from the gear ratio hold control to the normal transmission control.

Figure 4:
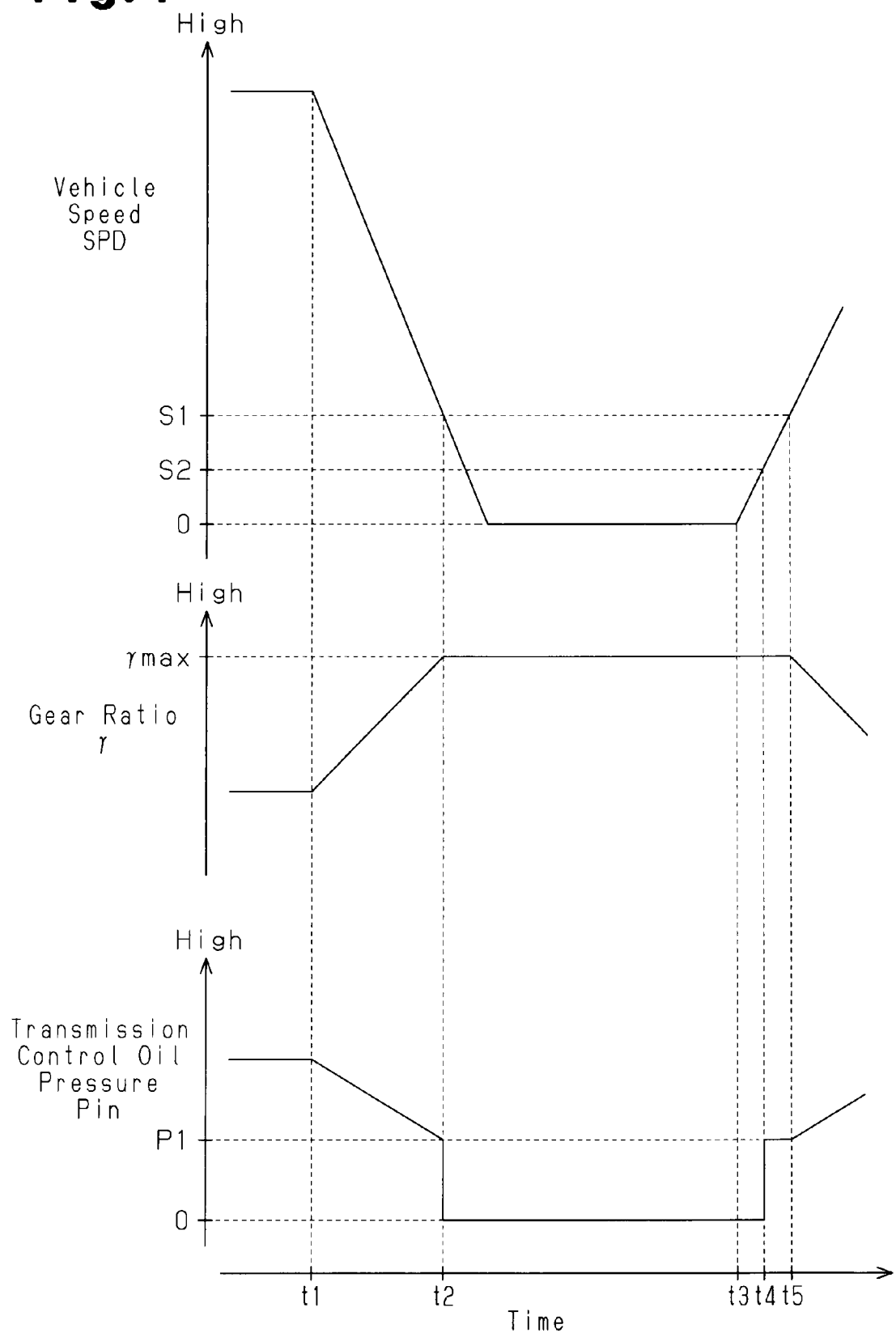
FIG. 4 is a time chart showing the relationship of variations in the vehicle speed when decelerating and stopping the vehicle in a normal manner with respect to variations in the transmission control oil pressure and the gear ratio.
Figure 5:
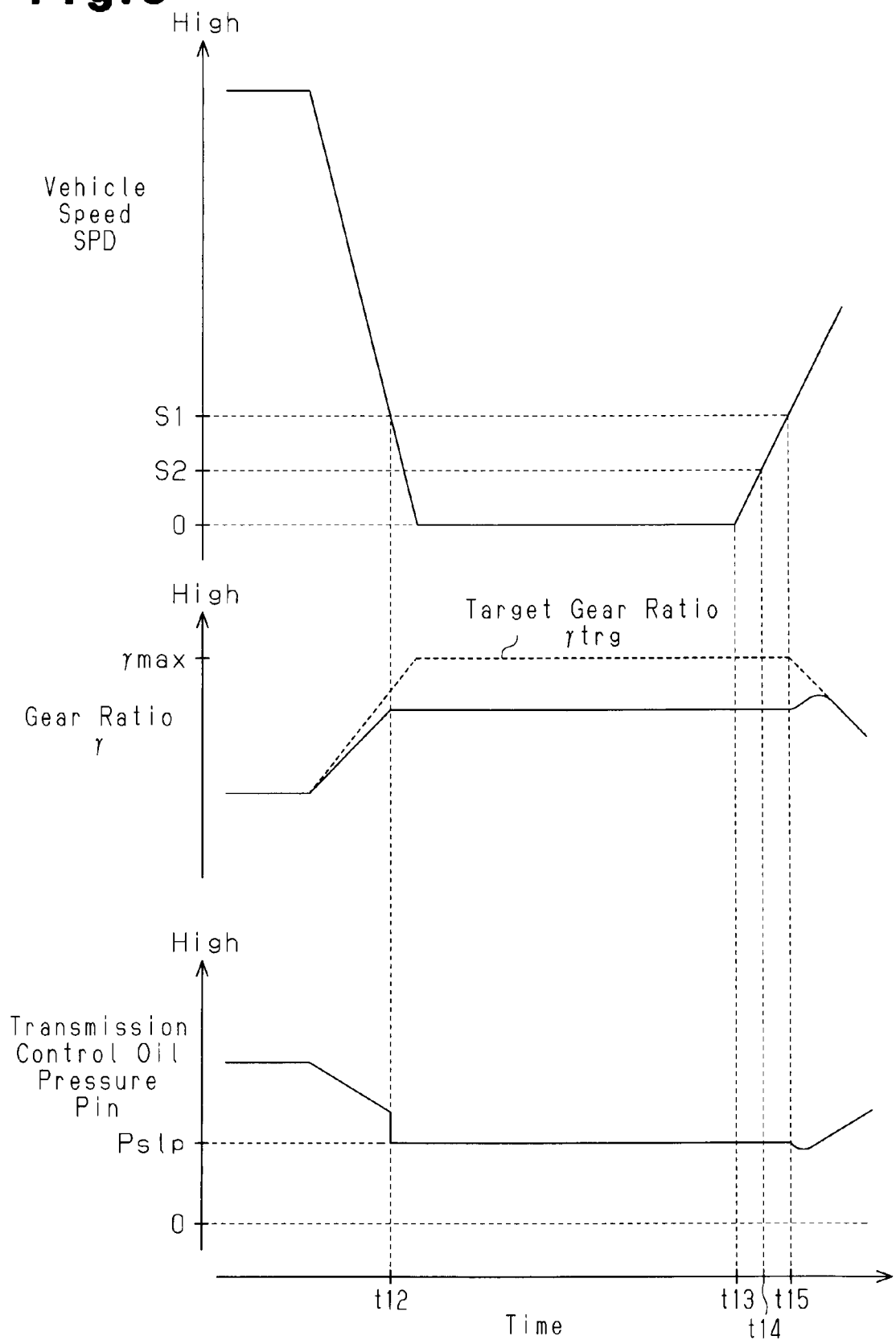
FIG. 5 is a time chart showing the relationship of variations in the vehicle speed when suddenly decelerating and stopping the vehicle with respect to variations in the transmission control oil pressure and the gear ratio.

The operation of the continuously variable transmission 100 when executing the gear ratio hold control will now be discussed with reference to FIGS. 4 and 5. FIG. 4 is a time chart showing the relationship of variations in the vehicle speed when decelerating and stopping the vehicle in a normal manner with respect to variations in the transmission control oil pressure and the gear ratio. FIG. 5 is a time chart showing the relationship of variations in the vehicle speed when suddenly decelerating and stopping the vehicle with respect to variations in the transmission control oil pressure and the gear ratio.

At time t1, when the brake pedal is depressed, a deceleration request is generated. As shown in FIG. 4, this lowers the vehicle speed SPD, decreases the transmission control oil pressure Pin, and increases the gear ratio γ.

At time t2, when it is determined that the gear ratio γ is the maximum gear ratio γmax and that the vehicle speed SPD has decreased to less than the first reference vehicle speed S1, the transmission control is shifted from the normal transmission control to the gear ratio hold control, operational oil is released from the oil pressure chamber 131 of the primary pulley 130, and the transmission control oil pressure Pin becomes "0".

This widens the groove width of the primary pulley 130 with the tension of the belt 140, and the groove width of the primary pulley 130 is held to be maximal in its variable range. As a result, the gear ratio γ is held at the maximum gear ratio γmax as shown in FIG. 4.

When the vehicle is stopped in this manner, the transmission control oil pressure Pin is held at "0", and the gear ratio γ is held at the maximum gear ratio γmax. At time t3, the vehicle starts to move. At time t4, when it is determined that the vehicle speed SPD has increased to the second reference vehicle speed S2 or greater, operational oil is accordingly drawn into the oil pressure chamber 131 of the primary pulley 130. Further, the transmission control oil pressure Pin is increased to the maximum gear ratio oil pressure P1. This fills the oil pressure chamber 131 with operational oil, while holding the gear ratio γ at the maximum gear ratio γmax. When the oil pressure chamber 131 is filled with operational oil in such a manner, the transmission control shifts from the gear ratio hold control to the normal transmission control.

As the vehicle speed SPD further increases, at time t5, the vehicle speed SPD becomes greater than or equal to the first reference vehicle speed S1. This restarts the varying of the gear ratio γ by the normal transmission control, increases the transmission control oil pressure Pin as the vehicle speed SPD rises, and decreases the gear ratio γ.

In contrast with the normal deceleration and stopping as shown in FIG. 4, sudden deceleration and stopping such as when the brake is suddenly applied as shown in FIG. 5 suddenly increases the target gear ratio γtrg as shown by the broken line. Thus, the gear ratio γ, which is shown by the solid line, cannot follow the target gear ratio γtrg. Further, when the vehicle speed SPD decreases to less than the first reference vehicle speed S1 (time t12 in FIG. 5), the gear ratio γ may be deviated from the maximum gear ratio γmax.

In such a case, in the transmission control of the present embodiment, when it is determined at time t12 that the vehicle speed SPD has decreased to less than the first reference vehicle speed S1 at time t12 as shown in FIG. 5, normal transmission control is suspended, and the transmission control shifts to the gear ratio hold control. This decreases the transmission control oil pressure Pin to the slipping limit oil pressure Pslp.

The gear ratio γ is then continuously held. At time t13, the vehicle starts to move. At time t14, when it is determined that the vehicle speed SPD has increased to the second reference vehicle speed S2 or greater, the transmission control is accordingly shifted from the gear ratio hold control to the normal transmission control.

As the vehicle speed SPD further increases, at time t15, the vehicle speed SPD increases to the first reference vehicle speed S1 or greater. This restarts the varying of the gear ratio γ by the normal transmission control, varies the transmission control oil pressure Pin as the vehicle speed SPD increases, and controls the gear ratio γ so as to conform to the target gear ratio γtrg.

The present embodiment has the advantages described below.

(1) The electronic controller 300 determines that the rotation speed Nout of the secondary pulley 150 cannot be accurately detected when the vehicle speed SPD is less than the first reference vehicle speed S1. Based on this determination, operational oil is released from the oil pressure chamber 131 of the primary pulley 130, and the gear ratio hold control for holding the gear ratio γ at the maximum gear ratio γmax is started. As a result, when the rotation speed Nout of the secondary pulley 150 cannot be accurately detected and the vehicle speed is in the extremely low vehicle speed range in which the actual gear ratio γ cannot be accurately detected, feedback control based on the calculated gear ratio γ is suspended. The tension of the belt 140 widens the primary pulley 130 and holds the groove width to be maximal. Thus, the gear ratio γ is held at the maximum gear ratio γmax.

When the gear ratio hold control is started, operation oil is released from the oil pressure chamber 131 of the primary pulley 130. Then, when the vehicle speed SPD increases to the second reference vehicle speed S2 or greater, the gear ratio hold control is ended, and operational oil is delivered to the pressure chamber 131. Subsequently, as the vehicle speed SPD further increases and becomes greater than or equal to the first reference vehicle speed S1, the varying of the gear ratio γ is restarted by normal transmission control.

Thus, by determining that the vehicle speed SPD is increasing toward the first reference vehicle speed S1 based on the increase of the vehicle speed SPD to the second reference vehicle speed S2 or greater, the oil pressure chamber 131 of the primary pulley 130 may be filled with operational oil beforehand. As a result, when the vehicle speed SPD subsequently increases to the first reference vehicle speed S1 or greater, and the secondary pulley rotation speed sensor 306 is able to accurately detect the rotation speed Nout of the secondary pulley 150, the primary pulley 130 has already been filled with operational oil. This allows for the varying of the gear ratio γ by the normal transmission control to be readily restarted.

In other words, operational oil is released from the oil pressure chamber 131 of the primary pulley 130 when in the extremely low vehicle speed range to hold the gear ratio γ at the maximum gear ratio γmax. Further, when the vehicle speed SPD increases such that the secondary pulley rotation speed sensor 306 may accurately detect the rotation speed Nout of the secondary pulley 150, the varying of the gear ratio γ may be readily restarted.

(2) In a state in which the brake is suddenly applied and the vehicle is suddenly decelerated and stopped, the target gear ratio γtrg is suddenly increased and set at the maximum gear ratio γmax. Thus, when the target gear ratio γtrg is set at the maximum gear ratio γmax and it is determined that the vehicle speed SPD has decreased to less than the first reference vehicle speed S1, the actual gear ratio γ may not yet have increased to the maximum gear ratio γmax when the gear ratio hold control is started based on the determination (time t12 in FIG. 5).

In a state in which the gear ratio γ is deviated from the maximum gear ratio γmax, the target gear ratio γtrg may be set at the maximum gear ratio γmax and it may be determined that the vehicle speed SPD has decreased to less than the first reference vehicle speed S1. In such a case, when operational oil is immediately released from the oil pressure chamber 131 of the primary pulley 130 based on the determination, the groove width of the primary pulley 130 suddenly increases. This may cause slipping of the belt 140 on the pulleys 130 and 150. To solve this problem, in the above-discussed embodiment, if the actual gear ratio γ is not the maximum gear ratio γmax when the gear ratio hold control is started, instead of releasing operational oil from the oil pressure chamber 131 of the primary pulley 130 to adjust the gear ratio γ to the maximum gear ratio γmax, the transmission control oil pressure Pin is decreased to the slipping limit oil pressure Pslp. Such a structure suppresses slipping of the belt 140 that would occur when the groove width of the primary pulley 130 is suddenly increased, while decreasing the transmission control oil pressure Pin to maximize the gear ratio γ.

The above-discussed embodiment may be modified as described below.

In the above-discussed embodiment, the vehicle speed SPD is calculated from the rotation speed Nout of the secondary pulley 150 detected by the secondary pulley rotation speed sensor 306. However, the vehicle speed SPD may also be calculated from the rotation speed of the wheels detected by the wheel speed sensors 307.

When the vehicle speed SPD is less than the first reference speed S1, the detection accuracy decreases in the secondary pulley rotation sensor 306 and the wheel speed sensor 307. Thus, the vehicle speed SPD may not be accurately detected. Here, it is only necessary to determine that the vehicle speed SPD is increasing to the first reference vehicle speed S1 based on an increase of the vehicle speed SPD, which is calculated from the detection value of the secondary pulley rotation speed sensor 306 or the wheel speed sensors 307, to the second reference vehicle speed S2 or greater so that the oil pressure chamber 131 of the primary pulley 130 is filled in advance with operational oil. Thus, when the vehicle speed SPD is less than the first reference vehicle speed S1, even if the detection accuracy of the secondary pulley rotation speed sensor 306 or the vehicle wheel sensors 307 is decreased and the calculation accuracy of the vehicle speed SPD is decreased, this would not be a significant problem.

DESCRIPTION OF THE REFERENCE CHARACTERS

100 . . . continuously variable transmission, 110 . . . torque converter, 120 . . . forward-reverse switching mechanism, 121 . . . forward clutch, 122 . . . reverse brake, 130 . . . primary pulley, 131 . . . oil chamber (first oil chamber), 140 . . . belt, 150 . . . secondary pulley, 151 . . . oil chamber (second oil chamber), 160 . . . reduction gear, 170 . . . differential, 200 . . . oil pressure control unit, 300 . . . electronic controller serving as controller, 301 . . . accelerator position sensor, 302 . . . airflow meter, 303 . . . crank angle sensor, 304 . . . turbine rotation speed sensor, 305 . . . primary pulley rotation speed sensor, 306 . . . secondary pulley rotation speed sensor, 307 . . . wheel speed sensor.

The invention claimed is:

1. A controller for a vehicle continuously variable transmission, the vehicle continuously variable transmission including a primary pulley, which receives drive force from an internal combustion engine, a secondary pulley, which is coupled to a wheel, a belt, which runs around the pulleys to transmit the drive force from the primary pulley to the secondary pulley, and a rotation speed sensor, which detects a rotation speed of each of the pulleys, comprising:
   a controller that executes transmission control to vary a gear ratio by varying a transmission control oil pressure, which is an oil pressure of a first oil pressure chamber arranged in the primary pulley, and a narrowing control oil pressure, which is an oil pressure of a second oil pressure chamber arranged in the secondary pulley, while calculating an actual gear ratio based on the rotation speed of each pulley and executing feedback control so that the actual gear ratio conforms to a target gear ratio, wherein:
   when the target gear ratio is set as a maximum gear ratio and a vehicle speed is decreased to less than a first reference vehicle speed, the controller suspends varying of the gear ratio by the transmission control and starts a gear ratio hold control that releases operational oil from the first oil pressure chamber and holds the gear ratio at the maximum gear ratio, and
   the controller ends the gear ratio hold control and delivers operational oil to the first oil pressure chamber when the vehicle speed increases to a second reference vehicle speed or greater, which is lower than the first reference vehicle speed, and restarts the varying of the gear ratio by the transmission control when the vehicle speed subsequently increases to the first reference speed or greater.

2. The controller according to claim 1, wherein
   the controller releases operational oil from the first oil pressure chamber if the actual gear ratio is the maximum gear ratio when starting the gear ratio hold control and holds the gear ratio at the maximum gear ratio, and the controller decreases the transmission control oil pressure to a slipping limit oil pressure, which is the minimum oil pressure at which slipping of the belt does not occur on the two pulleys, if the actual gear ratio has not reached the maximum gear ratio when starting the gear ratio hold control.

3. The controller according to claim 2, wherein the slipping limit oil pressure is calculated based on torque received from the internal combustion engine and the narrowing control oil pressure.

4. The controller according to claim 1, wherein the vehicle speed is calculated based on the rotation speed of the secondary pulley detected by the rotation speed sensor.

5. The controller according to claim 1, wherein the vehicle speed is calculated based on a rotation speed of a wheel detected by a wheel speed sensor.

* * * * *